(12) United States Patent
Gaash et al.

(10) Patent No.: US 10,678,489 B2
(45) Date of Patent: Jun. 9, 2020

(54) IMPOSING PRINT JOBS FOR FRAME BY FRAME PRINTING

(71) Applicant: HP INDIGO B.V., Amstelveen (NL)

(72) Inventors: Amir Gaash, Ness Ziona (IL); Lior Krasnovsky, Apharetta, GA (US); Adam Lahav, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/072,947

(22) PCT Filed: Apr. 21, 2016

(86) PCT No.: PCT/EP2016/058921
§ 371 (c)(1),
(2) Date: Jul. 26, 2018

(87) PCT Pub. No.: WO2017/182083
PCT Pub. Date: Oct. 26, 2017

(65) Prior Publication Data
US 2019/0034139 A1    Jan. 31, 2019

(51) Int. Cl.
*G06F 3/12*     (2006.01)
*H04N 1/00*    (2006.01)
*B41J 3/407*   (2006.01)

(52) U.S. Cl.
CPC .......... *G06F 3/1251* (2013.01); *G06F 3/1205* (2013.01); *G06F 3/1208* (2013.01); *G06F 3/1219* (2013.01); *G06F 3/1262* (2013.01); *G06F 3/1282* (2013.01); *H04N 1/00222* (2013.01); *B41J 3/4075* (2013.01)

(58) Field of Classification Search
None
See application file for complete search history.

(56) References Cited

U.S. PATENT DOCUMENTS 7,812,997 B2   10/2010   Morales et al.
8,817,324 B2    8/2014   Giannetti et al.
(Continued)

FOREIGN PATENT DOCUMENTS

WO    WO-2011155950    12/2011

OTHER PUBLICATIONS

Shoji, Y. et al. "Mitsubishi Variable Size Commercial Web Offset Press", Lithopia Max-V, Realizing Dream of the Printing Industry (Field follow-up data), 3 pages, Sep. 2006.

*Primary Examiner* — Fan Zhang
(74) *Attorney, Agent, or Firm* — Middleton Reutlinger

(57) ABSTRACT

An example method is provided in accordance with the present disclosure, which may be used for example for aggregating print jobs on a web of print medium for frame by frame printing. The example method comprises imposing several print jobs, each comprising patterns to be printed, on the web of print medium, in at least two parallel lanes in the longitudinal direction of the web of print medium, wherein the patterns imposed in each frame are whole patterns, a starting point for the imposition of patterns in each lane and each frame depends on an end point of the imposed patterns in the same lane in the previous frame, and a frame rewind distance is determined for each frame whereby, when printing on the web of print medium, the starting point of each lane in one frame comes to be adjacent to the end point of the lane in the previous frame.

11 Claims, 5 Drawing Sheets

(56) References Cited

U.S. PATENT DOCUMENTS

| | | |
|---|---|---|
| 8,891,126 B2 | 11/2014 | Tufano |
| 2004/0003342 A1 | 1/2004 | Keane et al. |
| 2009/0033978 A1 | 2/2009 | Morales |
| 2009/0060610 A1 | 3/2009 | Matsuhashi |
| 2015/0104613 A1 | 4/2015 | Morales Garcia de la Vega et al. |
| 2019/0056892 A1* | 2/2019 | Himpe .................. B41J 2/0057 |

* cited by examiner

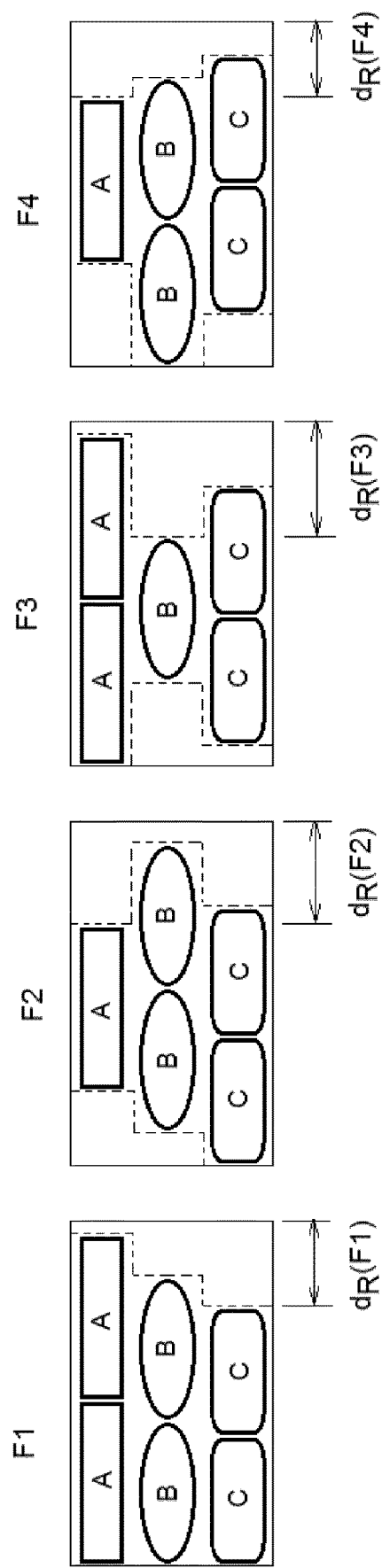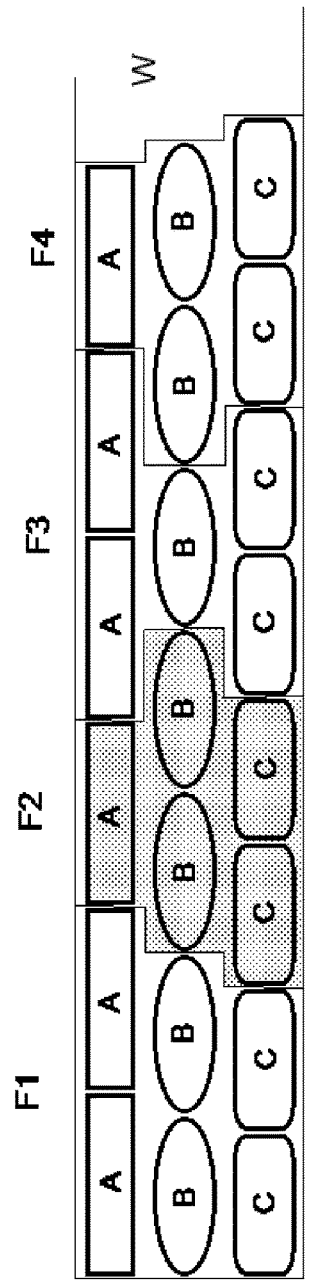
FIG. 5a
FIG. 5b

IMPOSING PRINT JOBS FOR FRAME BY FRAME PRINTING

BACKGROUND

When printing on large sheets or on a web of print medium, several print jobs may be aggregated and imposed to fill the sheets or web as much as possible. As a consequence, on the same sheet or web there may be patterns or images that are different from each other, for example from different print jobs.

Furthermore, when print jobs are printed on a web that is wider than the patterns of the print jobs, the patterns may be imposed and printed in several longitudinal lanes along the web. The web may thereafter be slit to form narrower rolls, one for each lane, and therefore each roll having one row of patterns. It may be useful, for example when printing labels, that all the labels in one lane are the same and that they are spaced uniformly, such that they may subsequently be applied using an automatic device. The same occurs with other print jobs that may be subsequently handled in an automated way.

Print jobs may also be printed on a web of print medium in a frame by frame printing apparatus, for example a web press comprising a rotary printing drum with a flexible blanket. In this case, when printing jobs are imposed on the web of print medium, account has to be taken of the maximum frame length, i.e. the maximum size of the frames in the longitudinal direction of the web, which depends on the size of the blanket.

BRIEF DESCRIPTION

Some non-limiting examples of the present disclosure will be described in the following with reference to the appended drawings, in which:

FIGS. 5a and 5b are schematic diagrams illustrating print jobs imposed in consecutive frames to be printed on a web of print medium, according to examples disclosed herein;

DETAILED DESCRIPTION

Figure 1:
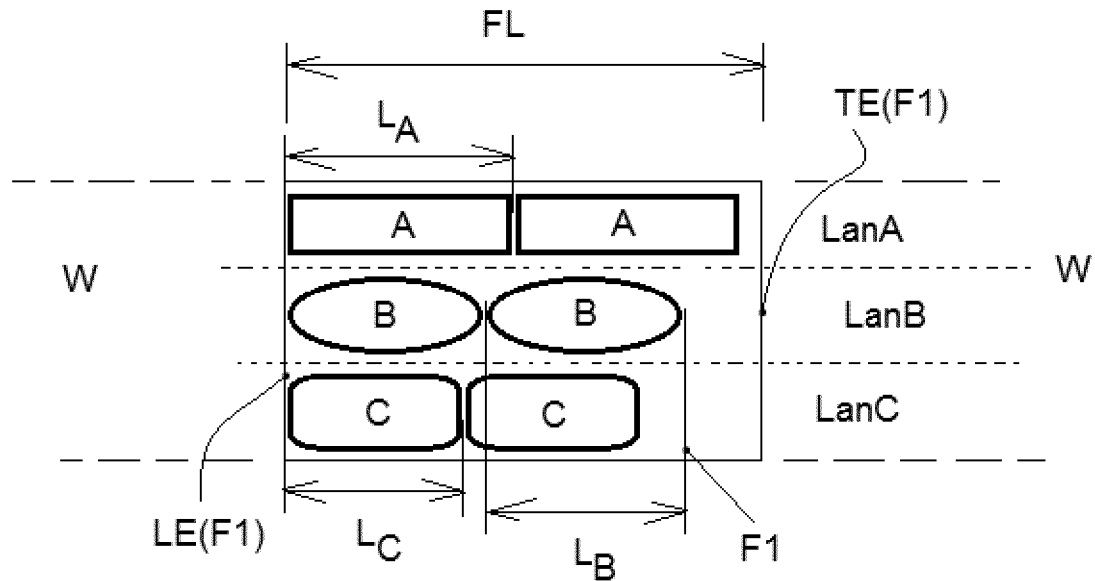
FIG. 1 illustrates schematically examples of a frame on which patterns are imposed in lanes.

Disclosed herein are methods for aggregating print jobs in several parallel longitudinal lanes on a web of print medium, to be printed in a frame by frame printing apparatus. A print job defines a predetermined set of images, frames, or data to be printed out in one lane or in multiple lanes of the web of print media.

Each print job may comprise patterns to be printed. For example the patterns may be labels, e.g. labels to be later applied to a product, or blanks to be subsequently transformed into boxes or other packages by punching, folding and applying adhesive, for example in automated lines, or any other kind of image.

Each print job may comprise a predetermined number of repetitions or copies of a pattern, such as a label or other image.

Print jobs to be aggregated on a web of print medium may comprise patterns that are different from one print job to another. The patterns may have different shapes and sizes. For example, the patterns of one print job may have a pattern length, herein defined as the maximum dimension of the pattern in the longitudinal direction of the web of print medium, while the patterns of another print job may have another pattern length.

For the sake of clarity, in the present disclosure the expressions "pattern" and "pattern length" encompass the actual image to be printed and also the spacing intended between adjacent images in the same lane, if any. For example, the spacing between printed labels that are later going to be applied by an automatic device may be, in some examples, between 2 and 8 mm. In an example where the spacing between labels is 4 mm, the pattern length in the present disclosure would be the label length plus the 2 mm of spacing on each side of the label, i.e. the label length plus 4 mm.

When jobs are imposed on a web of print medium for frame by frame printing, account has to be taken of the maximum frame length, i.e. the maximum size of the frames in the longitudinal direction of the web. The maximum frame length depends on the printing apparatus that is going to be used.

For reasons of accuracy, the imposition of patterns on the web of print medium may be done frame by frame and placing a number of whole patterns in each frame, i.e. avoiding placing one pattern spanning two consecutive frames. Thus, the imposed patterns may not fill the whole maximum frame length: for example, if they are imposed starting from the leading edge of each frame, a blank space or gap may remain between the last imposed pattern and the trailing edge of the frame. Such a gap involves a waste of print medium, and it may prevent the patterns from being evenly and suitably spaced along the web, which poses a problem in subsequent automatic handling.

When patterns that are imposed in different lanes of a web of print medium all have the same length, then the gap or blank space remaining at the end of the frame is the same for all the lanes, and for all the frames. A solution for avoiding the gap may be rewinding the web a constant rewind distance after printing each frame.

However, when print jobs to be aggregated comprise different pattern lengths, such that patterns imposed in different lanes of the web of print medium have different pattern lengths, then the gaps at the end of a frame may be different from one lane to another.

This situation may be illustrated by the example of FIG. 1, which shows a frame F1 having a maximum frame length FL in the longitudinal direction of the web W of print medium, between a leading edge LE(F1) of the frame and a trailing edge TE(F1) of the frame, on which three different patterns A, B and C having respective pattern lengths $L_A$, $L_B$ and $L_C$, such as for example three different labels, are shown imposed in three parallel lanes LanA, LanB, LanC in the longitudinal direction of the web W of print medium, starting at the leading edge LE(F1) of the frame.

The maximum frame length may depend on the printing apparatus or process that is employed for printing the web of print medium, and it is the same for all the frames on which patterns are imposed, even though the imposed area may be shorter than the maximum frame length and may be different from one frame to another.

The leading edge of the frame is defined as the edge where printing starts on the frame, during the printing operation on the web of print medium, i.e. the forward end in the direction of advance of the web of print medium during printing. The trailing edge of the frame is the opposite edge of the frame, i.e. the rearward end in the direction of advance of the web of print medium.

Patterns to be imposed and printed in implementations of methods as disclosed herein may have shapes different from those shown in FIG. 1, including regular and irregular shapes, and may have different sizes in the direction of the width of the web, so the width of a lane may be different from the width of another lane. Each pattern may also comprise a number of smaller patterns or images, different from each other or equal, to be printed together. Two, three or more parallel lanes may be defined on the web of print medium.

As visible in FIG. 1, due to the different pattern lengths, and therefore the different lane lengths, the gaps at the end of the frame are different from one lane to another. In this case, if after printing one frame the web of print medium is rewound a rewind distance tailored to one of the lanes, in the other lanes there would be either a gap or an overlap.

Figure 2:
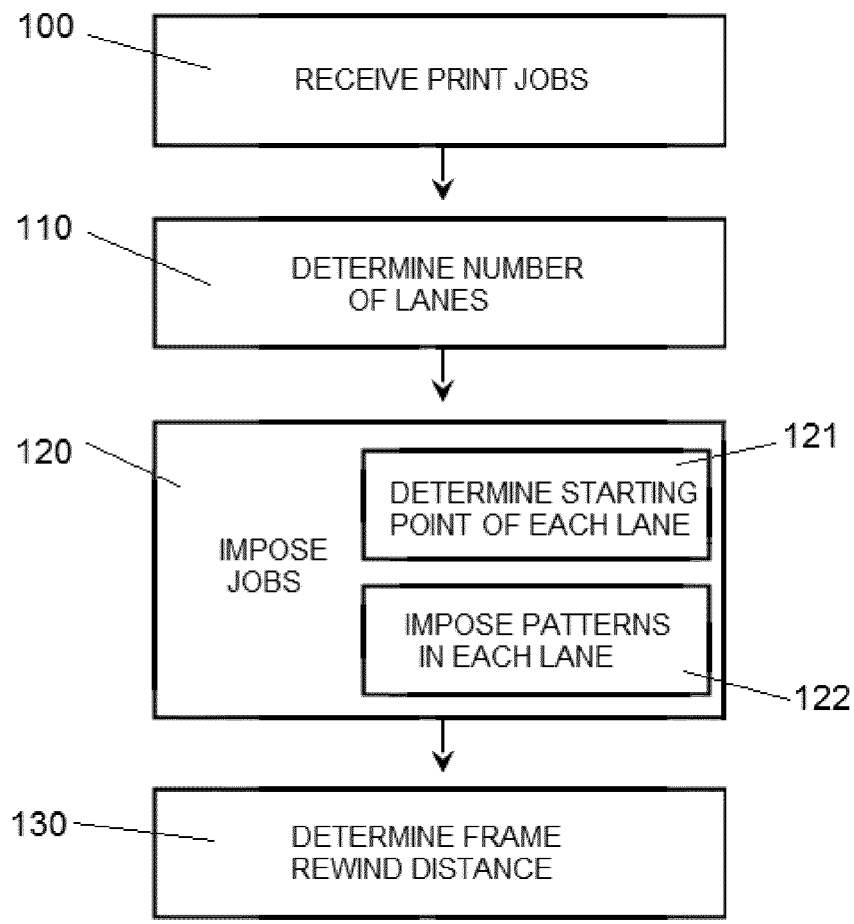
FIG. 2 is a flowchart illustrating examples of methods disclosed herein.

FIG. 2 illustrates some implementations of methods, as disclosed herein, for aggregating print jobs on a web of print medium for frame by frame printing, comprise imposing several print jobs, each comprising patterns to be printed, on the web of print medium, in at least two parallel lanes in the longitudinal direction of the web of print medium.

In block 100, print jobs to be aggregated may be received, each comprising patterns to be printed.

In block 110, a number of parallel lanes may be determined for a web of print medium, to impose the print jobs.

In block 120 the imposition may be performed: starting points for each lane may be determined in block 121, depending on an end point of the imposed patterns in the same lane in the previous frame, and in block 122 whole patterns may be imposed in each lane, starting at the starting point determined in block 121.

In some implementations, patterns having a first pattern length may be imposed in one lane and patterns having a second pattern length, different from the first pattern length, may be imposed in another lane.

In some implementations, a print job may be imposed in one lane, and another print job may be imposed in another lane.

In block 130 a frame rewind distance may be determined for each frame. The frame rewind distance may be determined such that if during the printing operation, after printing each frame, the web of print medium is rewound the determined frame rewind distance of the frame, then the starting point of each lane in one frame comes to be adjacent to the end point of the lane in the previous frame.

Imposing the patterns from a starting point, in each lane, that is related to the end point of the lane in the previous frame, and that may change from one frame to another, and determining a frame rewind distance, that may change from one frame to another, allows imposing and printing the jobs frame by frame, with a partial overlap of the frames, even if the patterns imposed in different lanes have different pattern lengths.

For example, the shape defined by the starting points of the lanes at the beginning of a frame may match the shape defined by the end points of the lanes at the end of the previous frame, such that there is a frame rewind distance that may bring the starting points of each lane of the frame adjacent to the end point of the lane in the previous frame.

This allows aggregating print jobs, even jobs comprising patterns that have different pattern lengths, and imposing them in parallel lanes of a web of print medium, and at the same time obtaining a printed product where in each lane along the web of print medium the patterns are evenly spaced.

Figure 3:
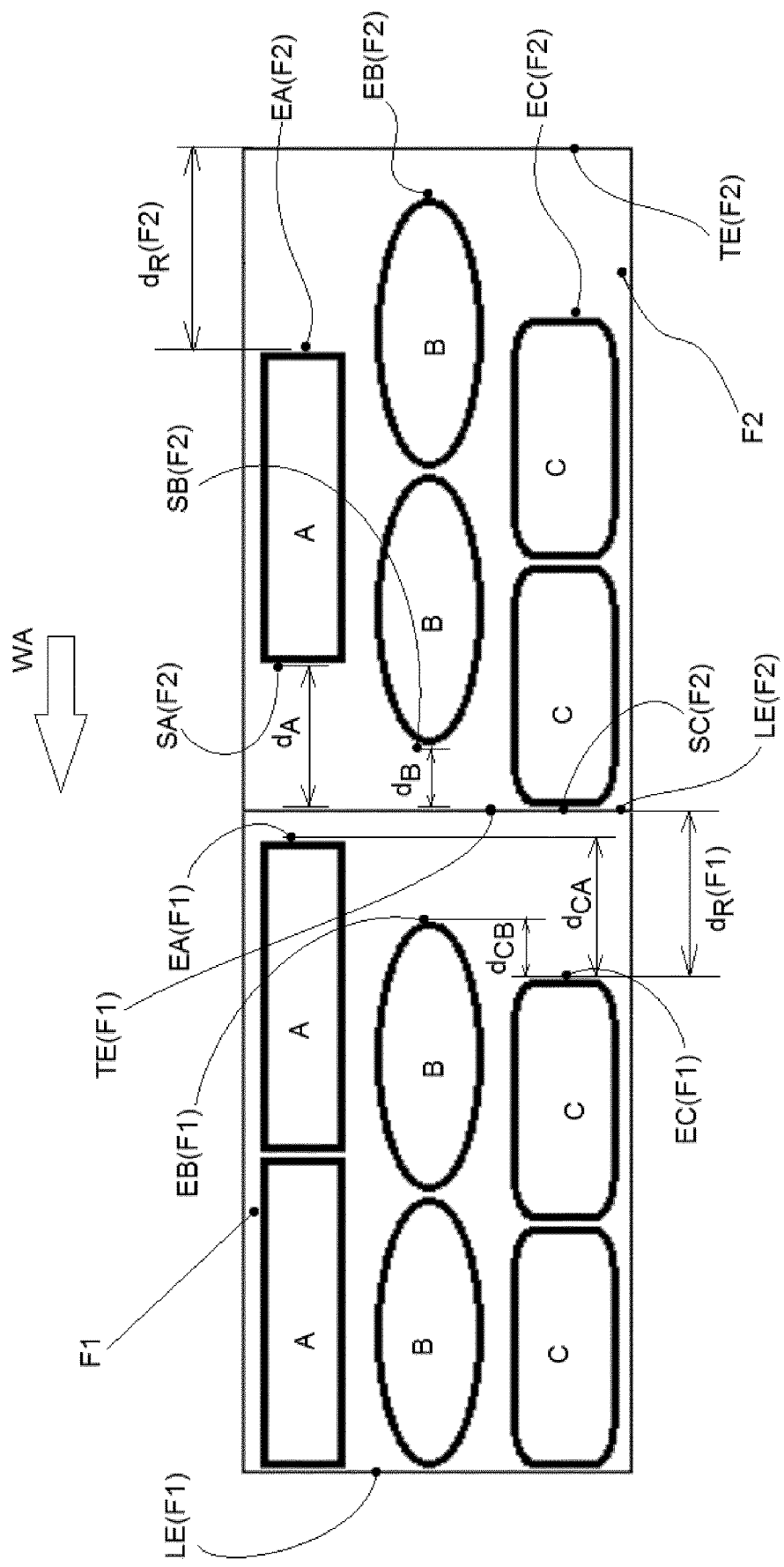
FIG. 3 illustrates schematically examples of two consecutive frames to be printed on a web of print medium.

FIG. 3 is used in the following to illustrate some expressions employed in the present disclosure. FIG. 3 shows two consecutive frames F1 and F2, to be printed on a web of print medium. Frame F1 may be the frame shown in FIG. 1.

Frame F1 and Frame F2 have the same maximum frame length FL, since they are intended to be printed in the same printing apparatus, each between a leading edge LE(F1) and LE(F2), respectively, and a trailing edge TE(F1) and TE(F2), respectively. Patterns A, B and C having different pattern lengths (in the longitudinal direction) are shown imposed in frames F1 and F2, in three lanes LanA, LanB, LanC of the web of print medium W.

In FIG. 3, arrow WA shows the direction of advance of the web of print medium during printing.

Also shown in FIG. 3, for frame F2, are starting points SA(F2), SB(F2), SC(F2) from where patterns A, B and C are imposed in each lane LanA, LanB and LanC respectively, and end points EA(F2), EB(F2), EC(F2) of the imposed patterns on each lane.

FIG. 3 also shows for frame F1 the end points EA(F1), EB(F1), EC(F1) of the imposed patterns A, B, C in the lanes LanA, LanB and LanC in this frame F1. Frame F1 may be the first frame to be imposed and printed. Frame F2 may be the next frame to be printed on the web of print medium W after frame F1.

Patterns A, B, C of several print jobs may be imposed in the frames according to implementations of methods for aggregating print jobs disclosed herein.

The example of FIG. 3 is used below to illustrate implementations of methods presented in the present disclosure.

Figure 4:
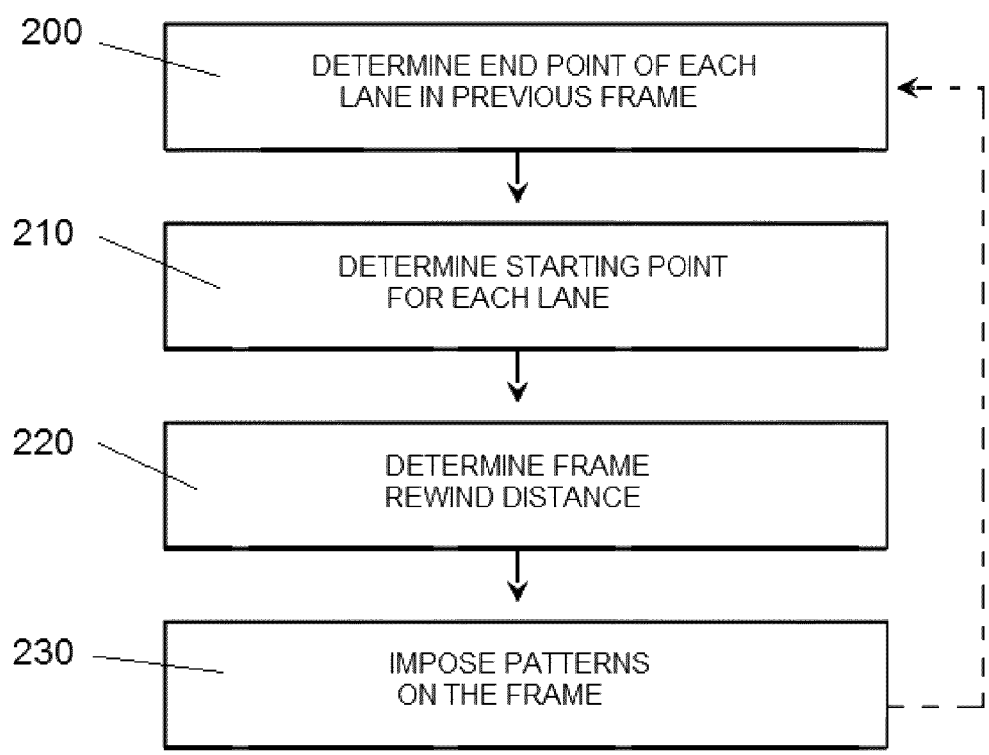
FIG. 4 is a flowchart illustrating example implementations of methods for aggregating print jobs on a web of print medium frame by frame.

FIG. 4 illustrates in a flowchart implementations of methods for aggregating print jobs on a web of print medium for frame by frame printing.

In block 200 of FIG. 4, the end points of patterns imposed in each lane of a previous frame may be determined.

For example, the end points EA(F1), EB(F1), EC(F1) of the lanes in frame F1 may be determined. This determination may be based on the starting points for the imposition in each lane, and on the number and pattern length of the patterns A, B, C imposed in each lane in frame F1. In the first imposed frame, in this example frame F1, the starting points for the imposition in each lane may coincide with the leading edge LE(F1) of the frame F1.

In block 210, the starting points for the imposition of patterns in each lane of the next frame may be determined, depending on the end points determined in block 200.

For example, each starting point SA(F2), SB(F2), SC(F2) of the lanes in frame F2 may be determined, respectively depending on the end points EA(F1), EB(F1), EC(F1) of the lanes in frame F1.

In some implementations, the starting point in each lane and each frame, for example starting point SA(F2) in the example of FIG. 3, may depend on the end point of the imposed patterns in the same lane in the previous frame, for example in this case EA(F1), and also on the end point of the imposed patterns in the shortest lane in the previous frame, which in the example of FIG. 3 is EC(F1).

The expression "the shortest lane" in a frame is meant to indicate that lane that has an end point furthest away from the trailing end of the frame than the other lanes (and therefore closer to the leading edge of the frame than the other lanes), leaving the largest gap at the trailing end of the frame. For example, in FIG. 3 the shortest lane in frame F1 is lane LanC; the shortest lane in frame F2 is also LanC, with the meaning given to the expression herein; even though the imposed area of lane LanA in this case may be shorter than the imposed area of lane LanC (because the imposed portion of lane LanA starts far from the leading edge).

In some example implementations of methods disclosed herein, the starting point of each lane is set at a distance from a leading edge of the frame that is equal to the distance between the end point of the imposed patterns in the same lane in the previous frame and the end point of the imposed patterns in the shortest lane in the previous frame.

In the example shown in FIG. 3, SA(F2) is set at a distance $d_A$ from the leading edge LE(F2) of frame F2 that is equal to the distance $d_{CA}$ between EA(F1) and EC(F1), which is the end point of lane LanC in frame F1. Similarly, SB(F2) is set at a distance $d_B$ from the leading edge LE(F2) of frame F2 that is equal to the distance $d_{CB}$ between EB(F1) and the shortest lane end point EC(F1), and SC(F2) is set at the leading edge LE(F2) of frame F2.

As visible in FIG. 3, this arrangement of the starting points of the different lanes in frame F2 has the effect of forming a gap at the beginning (leading edge) of frame F2 with a shape that matches the gap remaining at the end (trailing edge) of frame F1. Therefore there is a frame rewind distance that may bring the starting points of each lane of the frame adjacent to the end point of the lane in the previous frame.

As already explained, in the first imposed frame in the aggregated job, in this example frame F1, the starting points for the imposition in each lane may coincide with the leading edge LE(F1) of the frame F1.

In block 220 a frame rewind distance may be determined, depending on the end points determined in block 200. The frame rewind distance may be the distance the web of print medium is rewound after printing the previous frame, for example after printing frame F1, and before the next frame, for example F2, is printed. This determination may be done such that by rewinding the web of print medium the determined frame rewind distance, the starting point of each lane in the frame F2 comes to be adjacent to the end point of the lane in frame F1.

The frame rewind distance for a frame may depend on the end point of the imposed patterns in the shortest lane in the previous frame. In the example of FIG. 3, the frame rewind distance $d_R(F1)$ for rewinding the web W of print medium after printing frame F1 and before printing frame F2 may depend on the end point EC(F1) of the shortest lane LanC of frame F1.

In some implementations, the frame rewind distance for a frame is equal to the distance between the trailing edge of the frame and the end point of the shortest lane in the frame. This may bring the starting points of all the lanes of a frame adjacent to the corresponding end points of the previous frame, when during the printing operation the web of print medium is advanced a constant distance when printing each frame, which is equal to the maximum frame length.

For example, with reference to FIG. 3, the rewind distance $d_R(F1)$ for rewinding the web of print medium after printing frame F1 may be the distance between the trailing edge of the frame TE(F1) and the end point EC(F1) of lane LanC, which is the shortest lane of Frame F1.

In block 230, whole patterns may be imposed on the frame, from the starting point of each lane determined in block 210. The whole patterns imposed in each lane may be as many, in number, as allowed by the available space in the lane. In some implementations the available space in each lane for imposing patterns is the space between the starting point of the lane and the trailing edge of the frame.

The expression "whole patterns" is employed to mean that all the pattern, i.e. all the pattern length, is imposed in one and the same frame. In other words, patterns are not divided so as to be printed partly in one frame and partly in another frame.

In the example of FIG. 3, whole patterns A, B and C are imposed respectively in lanes LanA, LanB, LanC of frame F2, each starting from its corresponding starting point SA(F2), SB(F2), SC(F2) previously determined.

As visible in the figure, one whole pattern A is imposed in lane LanA, because the available space in the lane and the pattern length of pattern A do not allow a second whole pattern A to be imposed. Two whole patterns B are imposed in lane LanB, and two whole patterns C are imposed in lane LanC.

End points EA(F2), EB(F2), EC(F2) of each lane LanA, LanB, LanC of frame F2 thus may result from imposing as many whole patterns A, B, C as allowed by the available space between the starting points SA(F2), SB(F2), SC(F2) of the lanes and the trailing edge TE(F2) of the frame.

From block 230, methods according to implementations disclosed herein may go back to block 200, where the same process may be repeated for the following frame, until all the patterns of the print jobs to be aggregated are imposed.

In the example of FIG. 3, the frame rewind distance dR(F2) for rewinding the web of print medium after printing frame F2 may be the distance between the trailing edge of the frame TE(F2) and the end point EA(F2) of lane LanA, which is the shortest lane of Frame F2.

In implementations disclosed above, for each frame the determination of the starting points and the determination of the frame rewind distance may be done one after the other, as disclosed in the examples above, or in the opposite order, or at the same time. Similarly, the imposition of patterns in each lane, after determining the starting points, may be done before, after, or at the same time as the determination of the frame rewind distance. In some implementations the rewind distance for each frame may be determined after imposing the patterns in all the frames to be printed.

Implementations of methods for aggregating print jobs on a web of print medium for frame by frame printing are illustrated in the following with reference to the example shown in FIGS. 5a and 5b, including numerical values. In the example, three print jobs are aggregated, each comprising a pattern (A, B or C) and a number of repetitions of the pattern.

The patterns are imposed in three lanes on the web of print medium, one with patterns A, one with patterns B, and one with patterns C, such that after printing the web may be slit in three rolls, each having repetitions of a single pattern, at the same distance from each other.

In this example, the maximum frame length, i.e. the dimension of each frame in the longitudinal direction of the web, is FL=1000 mm. The patterns A, B, C have pattern lengths $L_A$=460 mm, $L_B$=400 mm, and $L_C$=360 mm.

FIG. 5a shows the first four consecutive frames F1, F2, F3, F4 to be printed on the web of print medium, and the process for the imposition of the patterns in each frame is described in detail in the following. Dotted lines limiting the area that is printed in each frame are included in FIG. 5a for the sake of clarity, to highlight how the shape defined by the starting points of a frame may match the shape defined by the end points of the previous frame.

According to this example, in the first frame to be printed, patterns are imposed from the leading edge of the frame, for each lane. For subsequent frames, the starting point of each lane is set at a distance from the leading edge of the frame that is equal to the distance, in the previous frame, between the end point of the same lane and the end point of the shortest lane. The rewind distance for each frame is the distance between the trailing edge of the frame and the end point of the shortest lane.

In the following examples, the starting points and the end points of each frame and lane are identified with their distance from the leading edge of the frame.

Frame F1
Starting points (distance from the leading edge of the frame):
SA(F1)=SB(F1)=SC(F1)=0
Imposition (maximum number of patterns in the available space):
2 patterns A in the first lane
2 patterns B in the second lane
2 patterns C in the third lane
End points (distance from the leading edge of the frame):
EA(F1)=2×$L_A$=2×460=920 mm
EB(F1)=2×$L_B$=2×400=800 mm
EC(F1)=2×$L_C$=2×360=720 mm (shortest lane)
Rewind distance after printing frame F1:
$d_R$(F1)=FL−EC(F1)=1000−710=280 mm
Frame F2
Starting points:
SA(F2)=EA(F1)−EC(F1)=920−720=200 mm
SB(F2)=EB(F1)−EC(F1)=800−720=80 mm
SC(F2)=0
Imposition:
1 pattern A
2 patterns B
2 patterns C
End points:
EA(F2)=SA(F2)+1×$L_A$=200+460=660 mm (shortest)
EB(F2)=SB(F2)+2×$L_B$=80+2×400=880 mm
EC(F2)=SC(F2)+2×$L_C$=2×360=720 mm
Rewind distance after printing frame F2:
$d_R$(F2)=FL−EA(F2)=1000−660=340 mm
Frame F3
Starting points:
SA(F3)=0
SB(F3)=880−660=220 mm
SC(F3)=720−660=60 mm
Imposition:
2 patterns A
1 pattern B
2 patterns C
End points:
EA(F3)=2×460=920 mm
EB(F3)=220+1×400=620 mm (shortest lane)
EC(F3)=60+2×360=780 mm
Rewind distance after printing frame F3:
$d_R$(F3)=1000−620=380 mm
Frame F4
Starting points:
SA(F)=920−620=300 mm
SB(F)=0
SC(F)=780−620=160 mm
Imposition:
1 pattern A
2 patterns B
2 patterns C End points:
EA(F4)=300+1×460=760 mm (shortest lane)
EB(F4)=2×400=800 mm
EC(F4)=160+2×360=880 mm
Rewind distance after printing frame F4:
$d_R$(F4)=1000−760=240 mm FIG. 5b illustrates a web W of print medium once the four frames F1, F2, F3, F4 of FIG. 5a have been printed. Lines have been drawn in FIG. 5b identifying the borders of the image area printed by each frame and corresponding to the dotted lines in FIG. 5a, and frame F2 has been shadowed, in order to show how the image areas printed by the consecutive frames match each other on the web of print medium W and allow the patterns in each lane to be printed at even distances along the web of print medium.

Figure 6:
FIG. 6 is a schematic diagram of a data file produced in examples of a method as disclosed herein.

Some implementations of methods for aggregating print jobs for frame by frame printing comprise producing a data file DF, for example as shown schematically in FIG. 6, comprising the imposition IMP (F1, . . . Fn) of print jobs on the web of print medium, frame by frame, from a first frame F1 to a last frame Fn, and the frame rewind distance $d_R$(F1), . . . dR(Fn), for each frame from F1 to Fn. The data file may comprise a Portable Document Format file with one page for each frame, and a table with the frame rewind distances. It may also comprise a JPG or JPEG, or other image format file, for each frame, and a table with the frame rewind distances. The data file DF may be provided to a printing apparatus for printing the aggregated jobs on a web of print medium.

Figure 7:
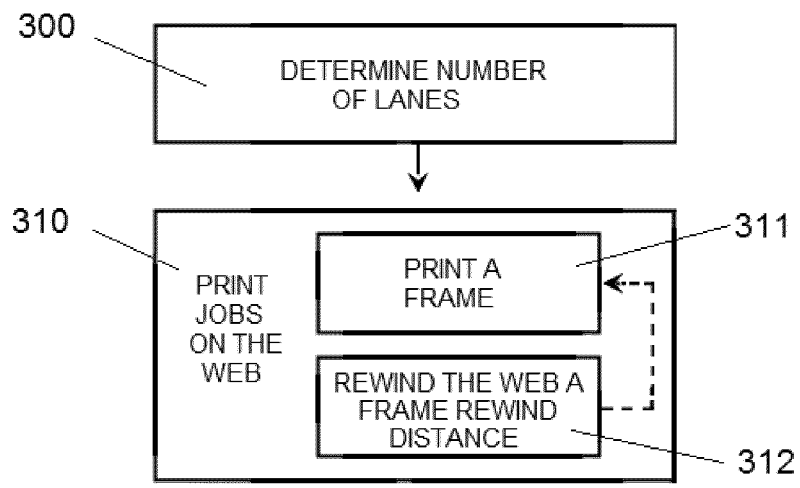
FIG. 7 is a flowchart illustrating some example implementations of methods for printing frame by frame on a web of print medium.

FIG. 7 illustrates some implementations of methods for printing frame by frame on a web of print medium.

Some implementations of the method comprise, in block 300, imposing frame by frame several print jobs, each comprising patterns to be printed, on the web of print medium frame by frame, in at least two parallel lanes in the longitudinal direction of the web of print medium. The imposition may be made imposing whole patterns in each frame, from a starting point in each lane and each frame that depends on an end point of the patterns imposed in each lane in the previous frame.

In some implementations, the starting points in each lane of the frame are set at a distance from a leading edge of the frame that is equal to the distance between the end point of the imposed patterns in the same lane in the previous frame and the end point of the imposed patterns in the shortest lane in the previous frame, as for example described above in relation with starting points SA(F2), SB(F2) and SC(F2) in FIGS. 3 and 4.

In block 310 the imposed print jobs may be printed on the web of print medium, frame by frame. A frame is printed in block 311, after which the web of print medium is rewound a frame rewind distance in block 312, and the process returns to block 311 for printing the next frame.

In some implementations the frame rewind distance is such that the starting point of each lane in one frame, such as for example points SA(F2), SB(F2) and SC(F2) in FIG. 3, comes to be adjacent to the end point of the lane in the previous frame, such as for example points EA(F1), EB(F1) and EC(F1) in FIG. 3.

According to some implementations, for example as explained above in relation with FIGS. 3 and 4, the frame rewind distance dR(F1) for rewinding the web of print medium, after printing a frame F1 and before printing the next frame F2, may be the distance between the trailing edge TE(F1) of the frame F1 and the end point EC(F1) of the imposed patterns in the shortest lane LanC in frame F1.

Figure 8:
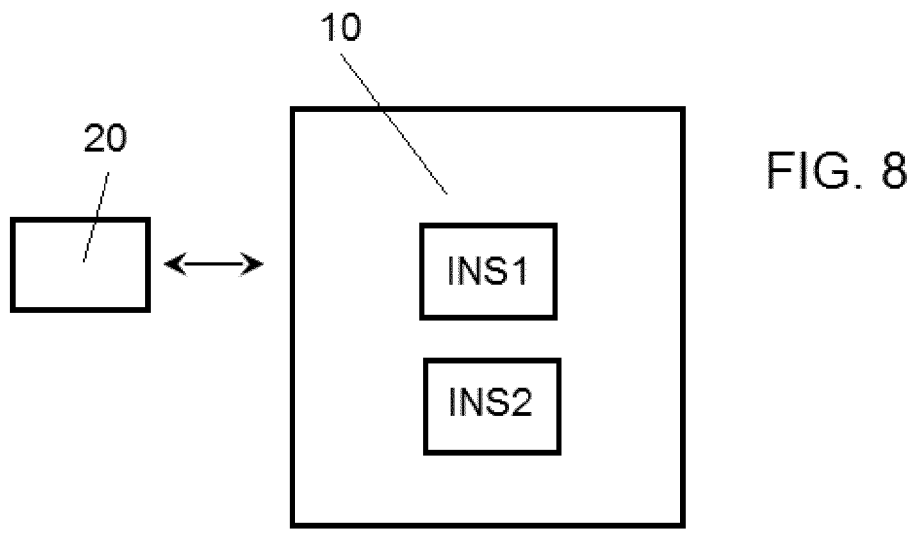
FIG. 8 is a block diagram of a non-transitory, computer-readable medium that may store instructions for carrying out example implementations of the present disclosure.

The block diagram of FIG. 8 shows some implementations of a non-transitory machine-readable storage medium 10 encoded with instructions executable by a processor 20.

The machine-readable storage medium 10 may comprise instructions INS1 to impose several print jobs, each comprising patterns to be printed, on a web of print medium frame by frame, in at least two parallel lanes in the longitudinal direction of the web of print medium, and instructions INS2 to determine a frame rewind distance for each frame, for example as in implementations disclosed above in relation with FIGS. 3 and 4.

Although a number of particular implementations and examples have been disclosed herein, further variants and modifications of the disclosed devices and methods are possible. For example, not all the features disclosed herein are included in all the implementations, and implementations comprising other combinations of the features described are also possible.

The invention claimed is:

1. A method for aggregating print jobs on a web of print medium for frame by frame printing, comprising imposing several print jobs, each comprising patterns to be printed, on the web of print medium, in at least three parallel lanes in the longitudinal direction of the web of print medium, wherein
a frame crossing the three parallel lanes includes whole patterns imposed in each lane of the frame, and
a frame rewind distance is determined for each frame whereby, when printing on the web of print medium, the starting point of each lane in one frame comes to be adjacent to an end point of the lane in the previous frame; and wherein the method comprises:
determining end points of patterns imposed in each lane of the previous frame;
based on the determined end points of the previous frame, identifying, as a shortest lane, a first lane of the at least three parallel lanes;
determining a first distance between the end point of the imposed patterns of a second lane of the at least three parallel lanes and the end point of the imposed patterns in the shortest lane in the previous frame;
determining a second distance between the end point of the imposed patterns of a third lane of the at least three parallel lanes and the end point of the imposed patterns in the shortest lane in the previous frame;
setting the starting point for the imposition of patterns in the second lane of the frame as the first distance from the leading edge of the frame;
setting the starting point for the imposition of patterns in the third lane of the frame as the second distance from the leading edge of the frame.

2. A method in accordance with the method of claim 1, wherein the frame rewind distance for each frame depends on the end point of the imposed patterns in the shortest lane in the previous frame.

3. A method in accordance with the method of claim 2, wherein the frames have a maximum frame length between a leading edge of the frame and a trailing edge of the frame, in the longitudinal direction of the web of print medium, and the frame rewind distance for each frame is equal to the distance between the trailing edge of the frame and the end point of the imposed patterns in the shortest lane in the frame.

4. A method in accordance with the method of claim 1, wherein the frames have a maximum frame length between a leading edge of the frame and a trailing edge of the frame, in the longitudinal direction of the web of print medium, and print jobs are imposed in each lane starting at the starting point and including as many whole patterns as allowed by the available space between the starting point of the lane and the trailing edge of the frame.

5. A method in accordance with the method of claim 1, wherein
the frame rewind distance for each frame is equal to the distance between a trailing edge of the frame and the end point of the imposed patterns in the shortest lane in the frame.

6. A method in accordance with the method of claim 1, comprising imposing in one lane patterns having a first pattern length, in the longitudinal direction of the web of print medium, and imposing in another lane patterns having a second pattern length, different from the first pattern length.

7. A method in accordance with the method of claim 1, comprising imposing a print job in one lane and another print job in another lane.

8. A method in accordance with the method of claim 1, comprising producing a data file comprising the imposition of print jobs on the web of print medium, frame by frame, and the frame rewind distance for each frame.

9. A method in accordance with the method of claim 8, wherein the data file comprises a table with the frame rewind distances and a Portable Document Format file with one page for each frame, or a JPG, JPEG, or other image format file for each frame.

10. A printing system for printing frame by frame on a web of print medium, the system comprising instructions that, in response to execution of the instructions by a processor, cause the processor to:
impose frame by frame several print jobs, each comprising patterns to be printed, on the web of print medium, in at least three parallel lanes in the longitudinal direction of the web of print medium, such that a frame crossing the three parallel lanes includes whole patterns imposed in each lane of the frame;
determine end points of patterns imposed in each lane of a previous frame;
based on the determined end points of the previous frame, identify, as a shortest lane, a first lane of the at least three parallel lanes;
determine a first distance between the end point of the imposed patterns of a second lane of the at least three parallel lanes and the end point of the imposed patterns in the shortest lane in the previous frame;
determine a second distance between the end point of the imposed patterns of a third lane of the at least three parallel lanes and the end point of the imposed patterns in the shortest lane in the previous frame;
set the starting point for the imposition of patterns in the second lane of the frame as the first distance from the leading edge of the frame;
set the starting point for the imposition of patterns in the third lane of the frame as the second distance from the leading edge of the frame; and
print the imposed print jobs on the web of print medium frame by frame, wherein after printing each frame, the web of print medium is rewound a frame rewind distance such that the starting point of each lane in one frame is adjacent to the end point of the lane in the previous frame.

11. A non-transitory machine-readable storage medium encoded with instructions executable by a processor, the machine-readable storage medium comprising:
instructions to impose several print jobs, each comprising patterns to be printed, on a web of print medium frame by frame, in at least three parallel lanes in the longitudinal direction of the web of print medium, such that a frame crossing the three parallel lanes includes whole patterns imposed in each lane of the frame;

instructions to determine end points of patterns imposed in each lane of a previous frame;

instructions to, based on the determined end points of the previous frame, identify, as a shortest lane, a first lane of the at least three parallel lanes;

instructions to determine a first distance between the end point of the imposed patterns of a second lane of the at least three parallel lanes and the end point of the imposed patterns in the shortest lane in the previous frame;

instructions to determine a second distance between the end point of the imposed patterns of a third lane of the at least three parallel lanes and the end point of the imposed patterns in the shortest lane in the previous frame;

instructions to set the starting point for the imposition of patterns in the second lane of the frame as the first distance from the leading edge of the frame;

instructions to set the starting point for the imposition of patterns in the third lane of the frame as the second distance from the leading edge of the frame; and instructions to determine a frame rewind distance for each frame whereby, when printing on the web of print medium, the starting point of each lane in one frame comes to be adjacent to the end point of the lane in the previous frame.

* * * * *